Feb. 9, 1965    F. A. MILITANA    3,168,836
SPROCKET WITH A REPLACEABLE WEAR RIM FOR A CRAWLER TYPE VEHICLE
Filed March 5, 1963    2 Sheets-Sheet 1
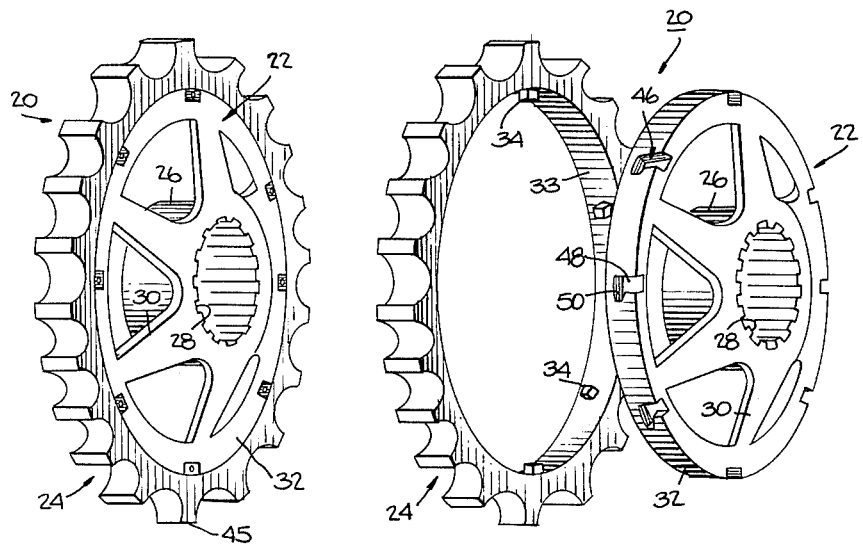
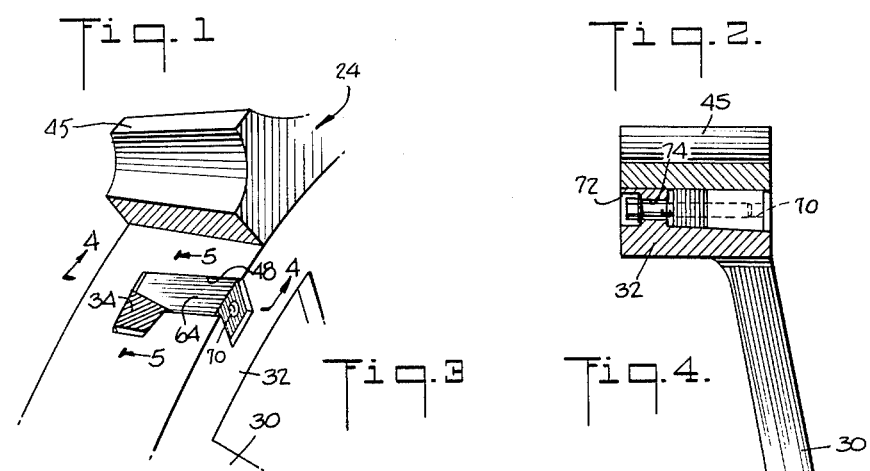
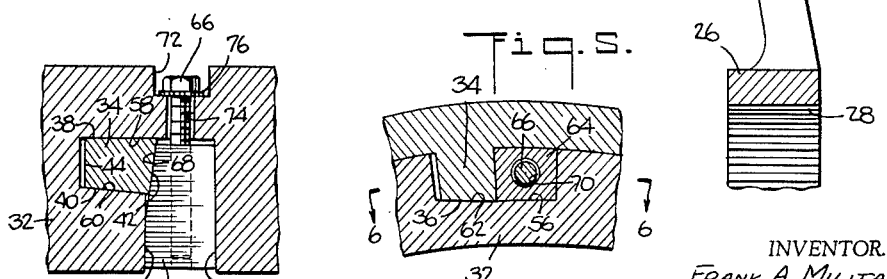
INVENTOR.
FRANK A. MILITANA
BY
ATTORNEYS Feb. 9, 1965   F. A. MILITANA   3,168,836
SPROCKET WITH A REPLACEABLE WEAR RIM FOR A CRAWLER TYPE VEHICLE
Filed March 5, 1963                      2 Sheets-Sheet 2
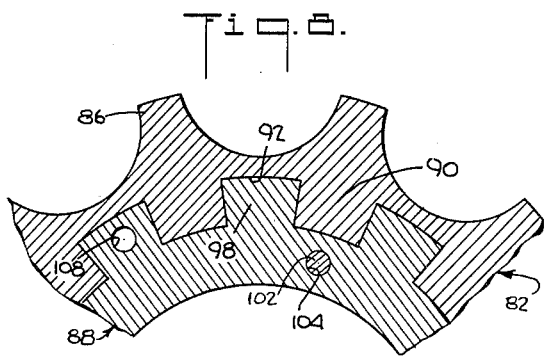
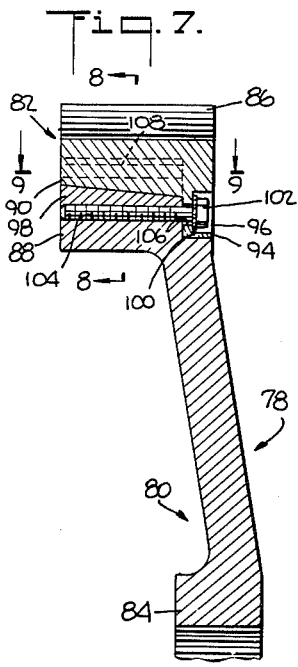
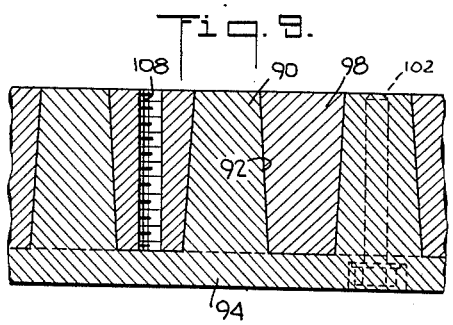
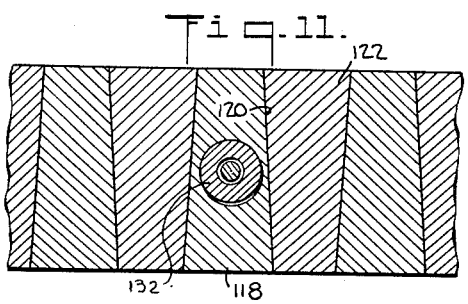
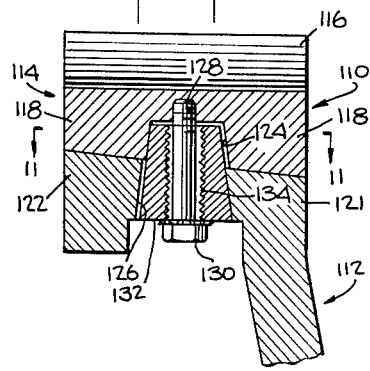
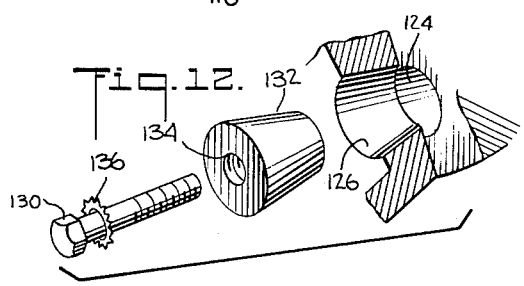
INVENTOR.
FRANK A. MILITANA
BY
ATTORNEYS

United States Patent Office 3,168,836
Patented Feb. 9, 1965

3,168,836
SPROCKET WITH A REPLACEABLE WEAR RIM
FOR A CRAWLER TYPE VEHICLE
Frank A. Militana, 550 Monterey Ave.,
Pelham Manor, N.Y.
Filed Mar. 5, 1963, Ser. No. 262,943
15 Claims. (Cl. 74—243)

This invention relates to a sprocket with a replaceable wear rim for a crawler type vehicle.

A sprocket of a crawler type vehicle and particularly the driving sprocket for such a vehicle is subjected to unusually hard wear even during normal usage. The sprocket teeth have imposed thereon heavy and sudden loads and despite the fact that they are formed of tough wear-resistant alloys the teeth become worn, scarred, bent, dented and otherwise deformed, ultimately to the point that the sprocket no longer is useful. At this time either the sprocket must be replaced or a new sprocket rim substituted for the worn one. A new sprocket is very expensive, its cost running to a hundred dollars or more.

It has been proposed to weld a fresh sprocket rim to a core in the place of the old rim. However, since this operation is not carried out under closely controlled conditions the welded replacement wear rim usually is misaligned and only causes further difficulties because it wears too rapidly and causes undue wear to the crawler track chain.

The replacement of a complete old worn sprocket with a fresh one entails substantial difficulties. To remove the worn sprocket it is necessary first to remove the bottom truck frame and also to put in a fresh oil seal. Both of these operations consume much time.

It is an object of my present invention to provide a sprocket which is specially designed to have a wear rim that is readily removable and rapidly replaceable on the core whereby such rims can be interchanged in the field without removing the bottom truck frame and without incorporating a fresh oil seal. Thereby not only is the expense of substituting a fresh sprocket rim considerably reduced, but a great deal of time is saved. In other words, it is a principal object of the present invention to provide a sprocket of the character described having a removable wear rim which can be dismounted and replaced faster, cheaper and more accurately than a new wear rim can be welded on or than a fresh sprocket can be substituted for a worn one.

It is another object of my invention to provide a sprocket of the character described in which the wear rim can be easily and quickly removed and replaced in the field with a simple series of steps by people other than trained tractor mechanics and without the use of special tools and equipment.

It is another object of my invention to provide a sprocket of the character described in which the drive connection between the replaceable wear rim and the core is extremely solid and strong so that it can withstand the unusual abuse to which sprockets of the character described are subjected, and moreover in which this drive connection is of such construction so that it can be quickly and readily tightened in the event of deformation due to great stresses.

It is another object of my invention to provide a sprocket of the character described in which the drive connection between the wear rim and core has no radial or circumferential looseness whatsoever so that, in effect, the rim and core are joined to one another as solidly as if they were in one piece.

It is an ancillary object of my invention to provide a sprocket of the character described in which the drive connection between the wear rim and core is effected by elements integral with said rim and core rather than by fastening elements such as nuts, bolts and screws which cannot be made sufficiently rugged to assimilate the shocks to which such sprocket wheels are subjected.

It is another object of my invention to provide a sprocket of the character described in which the driving connection between the wear rim and core is effected by wedgingly engaging elements that permit the aforesaid connection to be made up as tightly as desired despite manufacturing errors and tolerances.

Other objects of my invention in part will be obvious and in part will be pointed out hereinafter.

My invention accordingly consists in the features of construction, combination of elements and arrangements of parts which will be exemplified in the sprockets hereinafter described and of which the scope of application will be indicated in the appended claims.

In the accompanying drawings in which I have shown various possible embodiments of my invention, FIG. 1 is a perspective view of a sprocket constructed in accordance with my present invention, the wear rim being shown in assembled relationship with the core;

FIG. 2 is an exploded view of the parts of said sprocket except for the locking keys and tightening bolts;

FIG. 3 is an enlarged partially broken away sectional view of fragments of said rim and core;

FIG. 4 is a reduced sectional view taken substantially along the line 4—4 of FIG. 3;

FIG. 5 is an enlarged sectional view taken substantially along the line 5—5 of FIG. 3;

FIG. 6 is a sectional view taken substantially along the line 6—6 of FIG. 5;

FIG. 7 is a view similar to FIG. 4 of a sprocket embodying a modified form of my invention;

FIGS. 8 and 9 are enlarged sectional views taken substantially along the lines 8—8 and 9—9, respectively, of FIG. 7;

FIG. 10 is a view similar to FIG. 7, but to a larger scale, and partially broken away, of a sprocket embodying another modified form of my invention;

FIG. 11 is a sectional view to a slightly reduced scale taken substantially along the line 11—11 of FIG. 10; and FIG. 12 is an exploded perspective view of the parts used to tighten the driving connection of the sprocket shown in FIG. 10;

In general I carry out my invention by providing a sprocket including a sprocket wear rim with a large central opening so that the radial thickness of the rim is slight in comparison to the diameter of the rim. I further provide a large diameter core which nicely fits within the opening of the rim and is cooperable with the wear rim to effect a driving connection therewith. Fastening means is included to detachably secure the rim to the core whereby when the rim is worn after an extended period of hard use said means can be operated to release the rim and permit the replacement thereof with a fresh wear rim which then is tightened in place.

In the preferred form of my invention described in detail hereinafter a driving connection between the sprocket wear rim and the core is effected by peripherally disposed elements integral with the wear rim and the core and so constructed that multiple large flat areas of driving contact are secured and compressive forces at such areas thereby reduced to a point where the elements in mutual driving contact will not be permanently deformed by the forces incident to the rigorous use which such a sprocket experiences in the field. Moreover, said driving connection is structurally separate from the fastening means, e.g. bolts, that are utilized to secure the rim to the core, whereby I avoid the imposition of driving loads upon such relatively weak means and also avoids the difficulty of manipulating such means after the parts thereof have become misshapen over a period of use as they would be if used to transmit driving forces. However said fastening means conveniently is employed to tighten the driving connection.

An additional feature of the preferred form of my invention resides in the use of wedging parts to take up radial and circumferential slack whereby with a relatively small applied force, preferably an axial force supplied by the fastening means, I can solidly interconnect the wear rim and core in radial and circumferential directions. These wedging parts have wedging surfaces disposed respectively at a small angle to the local radius and at a small angle to the local circumference of the outer periphery of the core and the inner periphery of the wear rim so that when the fastening means tightens the rim on the core both circumferential and radial wedging motions of the rim take place.

Referring now in detail to the drawings, and more particularly to FIGS. 1 through 6, the reference numeral 20 denotes a sprocket constructed in accordance with my invention. Said sprocket is of the type which is specifically constructed for use in a crawler type vehicle of which common examples are tractors, mobile power shovels, and mobile cranes. The sprocket is adapted to be mounted on a shaft (usually a drive shaft at the rear end of the vehicle) and is of such physical bulk and is so integrated with the vehicle that if made in one piece, as it has heretofore, it would be necessary when it became worn to jack up the vehicle, remove the bottom truck frame and remove and replace an oil seal. These operations took many hours to perform and the price of a new one-piece sprocket was high. The present sprocket, by virtue of the construction soon to be described, overcomes all of these difficulties.

Basically the sprocket 20 includes a core 22 and a wear rim 24 both being fabricated from a tough wear-resistant metal such, for example, as a manganese or nickel chrome steel.

The core is provided with a hub 26 constructed and dimensioned to fit onto the end of a vehicle drive shaft. For this purpose the hub has a central through bore 28 which, as shown, may be splined if the end of the vehicle drive shaft is correspondingly contoured. Protruding outwardly from the hub and integral therewith are a set of radial spider arms 30. Typically six or eight of these may be employed, the number being determined by the maximum load that may be imposed. Alternatively, a disc may be employed instead of such arms.

The outer periphery of the core constitutes a large diameter circular hoop 32 which is in one piece with the arms 30 (or in one piece with the disc if such is employed).

The wear rim 24 has an inner periphery 33 which is shaped, i.e. circular, and dimensioned to engage the outer periphery of the hoop 32 with a sliding fit. That is to say, in the absence of the driving connection soon to be described the wear rim can be slipped on the hoop quite easily in an axial direction (parallel to the axis of rotation of the sprocket) and can turn easily in a direction circumferentially of the hoop and wear rim. The radial sliding clearance preferably is in the order of a few thousandths of an inch and both the outer periphery of the hoop and the inner periphery of the wear rim are very close to true circles so as to enable the wear rim to be fitted quickly and readily onto the hoop.

Pursuant to my present invention, disengageable means is provided to effect a driving connection between the hoop and the wear rim whereby the sprocket can be used to drive an endless track chain of a crawler type vehicle.

As shown in FIGS. 1-6, the disengageable means constitutes one set of elements integral with the inner periphery of the wear rim and another set of elements couplable to the elements of the first set in pairs, the latter set of members being integral with the outer periphery of the hoop. By thus locating said elements on the respective peripheries of the core and wear rim the driving force for any given driving torque is kept to a minimum so that the force at such paired elements can be designed with relative ease to be less than the force which would malform said members when the type of shock stress that is customary in such vehicles is encountered.

One element of each associated pair of couplable elements, and preferably each element of one entire set of elements, consists of a peripherally located protuberance and the other element of each such associated pair, and preferably each element of the entire second set of elements, consists of a peripherally located opening which mates with the associated protuberance. The protuberances and openings extend in a generally transverse direction (parallel to the axis of rotation of the sprocket) and in a generally radial direction, so that each associated projection and opening has a pair of opposing faces that butt against one another in a plane that extends in an approximately transverse direction and in an approximately radial direction and between which the driving connection is afforded. These planes are slightly inclined (canted) to the axis and circumference of the sprocket to achieve the aforesaid desired wedging engagement.

As shown, the inner periphery of the wear rim 24 is formed with at least three, eight being illustrated, protuberances in the form of equiangularly spaced radial driving lugs 34. The lugs are disposed in a common plane midway between the side faces of the wear rim and extend inwardly in the radial direction. The tips 36 of all the driving lugs are similarly sloped at a slight angle, e.g., 3° to 5° (see FIG. 5), to the local region of the circumference of the wear rim, or, in other words, at a slight angle to a plane normal to the radius of the wear rim at the site of the tip of the lug. One side face 38 (see FIG. 6) of each lug lies in a plane perpendicular to the axis of rotation of the sprocket while the other side face 40 of each lug lies in a plane which is at a slight angle, e.g., 3° to 5°, to a plane perpendicular to the axis of rotation of the sprocket, so that the side faces 38, 40 converge circumferentially toward one another at the slight mentioned angle. One end face 42 of each lug lies in a plane disposed at a slight angle, e.g., 3° to 5°, to the axis of rotation of the sprocket. The orientation of the other end face 44 of the lug is not of importance in this form of my invention.

To recapitulate: the base of each radial driving lug 34 is unitary with the inner periphery of the wear rim; the tip of each lug is canted slightly to the local circumference of the wear rim; the two side faces are slightly circumferentially convergent and one end face of each lug is slightly axially canted.

The outer periphery of the wear rim 24 is conventionally shaped to provide the customary sprocket teeth 45 the dimensions and contour which are appropriate for the particular sprocket.

The outer periphery of the hoop 32 is formed with a series of equiangularly spaced openings 46 equal in number to the number of driving lugs 34. The openings are L-shaped as viewed circumferentially (see FIG. 3) i.e. are bayonet-shaped, with one reach 48 of each opening running inwardly from a side of the hoop in a direction parallel to the axis of rotation of the sprocket. The inner terminal of each reach is approximately half-way between the sides of the hoop. The other reach 50 of each L-shaped opening 46 extends in a circumferential direction. The axial and circumferential reaches 48, 50 of all the openings 46 are parallel to one another and extend in the same directions.

The transverse cross-section of each axial reach 48 is such as to slidably admit the associated driving lug 34 when the latter is introduced into such reach in an axial direction, the walls 52, 54 of each such reach 48 matching the slope and circumferential spacing of the circumferentially remoter corners of the lug end faces 42, 44. The base 56 of each axial reach 48 is a segment of a circle centered on the axis of rotation of the sprocket.

The shape of each circumferential reach 50 matches that of the associated driving lug 34 except that the reach 50 is slightly longer in a circumferential direction than said lug. More particularly, the back wall 58 of the reach 50 is perpendicular to the axis of rotation of the sprocket and thereby matches the orientation of the lug side face 38. The front wall 60 of the reach 50 has a slope matching that of the lug side face 40. The shape of the bottom wall 62 of the reach 50 matches that of the lug tip 36.

To couple the wear rim to the hoop the driving lugs 34 are introduced into the open ends of the associated reaches 48 of the openings 46 at a side of the hoop and are slid axially through said reaches until they are aligned with the circumferential reaches 50. Thereupon the wear rim is rotated to slide the driving lugs into said reaches 50. The hoop and wear rim are so dimensioned that at this time their side faces are in approximate registry.

The fastening means employed to secure the hoop to the rim includes a series of pairs of locking keys 64 and tightening bolts 66, one pair being provided for each associated pair of driving lugs 34 and mating openings 46. Each locking key has a shape matching that of the axial reach 48 in which it is inserted except that the corner 68 of the key juxtaposed against the end face 42 of the driving lug is inclined to match the inclination of said end face. Each locking key is fashioned with an axial bore 70 which is tapped to receive the threaded shank of the affiliated tightening bolt 66. Said bolt has its polygonal head received in an oversized socket 72 on the side of the hoop remote from that on which the axial reach 48 opens, the socket being aligned with the bore 70 and communicating therewith through an untapped passageway 74.

After the driving lugs are hand seated within the circumferential reaches 50 there may be some slight radial play between the hoop and wear rim and, moreover, the lugs are not in good solid driving contact with the hoop. To provide such a good driving contact and to take up the radial play if present intially or if it occurs after a period of use, the locking keys 64 are slipped into the axial reaches 48 and the tightening bolts threaded into the bores 70.

As said bolts are tightened the locking keys are drawn forcefully into the hoop and a circumferential wedging engagement occurs between the slightly canted end faces 42 of the driving lugs and the matchingly slightly canted corners 68 of the locking keys, thereby forcing the lugs 34 further away from the axial reaches 48 and more deeply into the circumferential reaches 50 so that as the lugs bottom in the circumferential reaches the tips of the locking keys are solidly wedged between the driving lugs and the remote walls of the axial reaches.

Due to the matching sloping configuration of the tops of the lugs 36 and bottom walls 62 of the circumferential reaches a radial wedging engagement is engendered which imposes a radially outwardly directed force on all of the driving lugs.

In other words, the axial force exerted by the tightening means creates (a) a circumferential force between the driving lugs 34 and the locking keys 64 and (b) a radially outward force between the openings 46 and the tips 40 of the driving lugs. The first of these forces forms a solid driving contact between the hoop and the wear rim which prevents circumferential play and the second of these forces forms a solid contact between the hoop and the wear rim which prevents radial play. Thereby the hoop and rim through the utilization of a comparatively slight tightening force are joined to one another as solidly as if they were formed in one piece with each other.

The foregoing arrangement has the further advantage that if the openings and lugs become malformed during use the tightening bolts can be further tightened to take up any play that may be created. An additional advantage resides in the fact that if the openings become malformed and a fresh wear rim is used to replace an old worn one the tightening bolts can be made tight enough to take up any mismatch between the new lugs and the old openings.

To remove an old worn wear rim the tightening bolts are backed off slightly and their heads are tapped smartly with a hammer thus dislodging the locking key. Thereafter the tightening bolts are completely removed and the locking keys withdrawn. Next, a few sharp blows are struck on the worn teeth of the sprocket to force the driving lugs out of the circumferential reaches and the sprocket now can be removed by hand by threading the driving lugs in turn through the circumferential reaches and the axial reaches.

By virtue of the construction thus described an axial force exerted by the fastening means is transduced into two forces, one being a radial force which prevents any radial play in the made up sprocket and the other being a circumferential force which prevents any circumferential play at the driving connection of the made up sprocket.

Additionally in the form of my invention now being described the axial force exerted by the fastening means creates through wedging interengagement a transverse force which takes up any transverse (axial) play between the driving lugs and the walls 58, 60 of the openings 46.

It is desirable to employ suitable means to prevent the tightening bolts from working loose and to this end I insert a lock washer or shakeproof washer 76 under the head of each tightening bolt 66. Moreover, each socket 72 is made sufficiently large to admit a socket wrench for tightening or loosening the tightening bolt.

It will be appreciated from the foregoing that the specific structural concept by which I have effected a firm (solid) driving connection and radial connection between the detachable wear rim and the core consists in transducing the axial force generated by a fastening means through the medium of at least two pairs of wedging interengaged surfaces into circumferential forces and radial forces. This concept can be carried out by means of various mechanical structures, the one shown in FIGS. 1–6 simply being exemplificative. In FIGS. 7–9 and in FIGS. 10–12 I have shown other arrangements for accomplishing the same purpose. Thus in FIGS. 7–9 I have illustrated a drive sprocket 78 consisting of a core 80 and a wear rim 82. The core has an apertured hub 84 and the wear rim has sprocket teeth 86. The wear rim is formed with a large central opening and the core with a hoop 88.

The disengageable driving connection in this form of my invention consists, in essence, of a two-way tapered splined connection between the inner periphery of the wear rim and the outer periphery of the hoop. Thus the inner periphery of the wear rim consists of a series of radially inwardly extending teeth 90 separated by spaces 92. The teeth are preferably all of the same shape and are spaced apart equally around the inner circumference of the hoop. Moreover the average width of the teeth is equal to the average width of the spaces between the teeth. One face of the wear rim is formed with an inwardly directed flange 94 having a series of sockets 96 which may be radially aligned with the corresponding teeth 90 and are located radially inwardly thereof.

In order to provide the various wedging interengagements for developing circumferential and radial contact between the wear rim and hoop the rim teeth 90 are formed with two different tapers which as in the case of the tapers on the various components of the sprocket 20 are illustrated exaggeratedly so that they may be more readily seen. More particularly, the opposite flanks of each rim tooth 90 converge, i.e. are tapered in an axial direction, extending away from the flange 94 so that, as best shown in FIG. 9, the width of each tooth is greatest adjacent the flange 94 and is least at the remotest point from the flange. The taper is comparatively slight, e.g. 3°–5°, to the axis of rotation of the sprocket.

In addition to the foregoing taper which, as soon will be seen, is employed to effect a good driving connection, each rim tooth additionally has another taper which is at a slight angle to the normal to the radius at the tooth. This taper can best be seen in FIG. 7 and consists in tapering the radial height of the tooth in a direction away from the flange 94 whereby the height of each tooth is greatest adjacent the flange and is least at the point remotest from the flange.

The hoop 88 likewise is formed with a series of teeth 98 which match the shapes of the spaces 92. The hoop teeth 98 have spaces therebetween which match the shapes of the rim teeth 90 except that they are oppositely tapered thereby the hoop teeth are tapered in a direction toward the flange 94 (see FIG. 9) instead of in a direction away from the flange 94 as are the rim teeth 90. The hoop teeth have their flanks converging towards one another and also are tapered in height, the spaces 92 likewise being tapered in height to match the configuration of the rim teeth. All tapers are substantially the same so that when a rim is axially slipped onto a hoop the tapers of the various teeth and spaces will match one another. The side of the hoop 88 which will be engaged by the flange 94 is formed with an annular groove 100 to accommodate said flange.

The fastening means employed in the drive sprocket 78 consists of a series of tightening bolts 102 (no locking keys are required since the rim teeth and hoop teeth serve the function thereof). The hoop is formed with a series of tapped bores 104 which extend in a direction parallel to the axis of rotation of the sprocket. Each bore 104 is aligned with a socket 96, the socket including an untapped passageway 106 to pass the shank of the tightening bolt 102.

To mount the wear rim 82 on the core 80 the rim teeth 90 are lined up with the spaces between the hoop teeth 98 and the rim then slid axially onto the hoop until they are hand tight. Next the tightening bolts are inserted into the sockets 96 and through the untapped passageways 106 and are threaded into the bores 104. The tightening bolts then are turned home thereby developing at the fastening means a tightening force parallel to the axis of rotation of the sprocket (an axial force). Two consequent wedging engagements take place, one between the flanks of the rim teeth 90 and the flanks of the hoop teeth 98 and the other between the tips of both sets of teeth and the corresponding bases of the spaces (gaps) between the opposed teeth. The wedging engagement between the flanks of the teeth which takes place upon exerting a make up torque on the tightening bolts creates a circumferentially directed compressive force between such teeth which cause the flanks of the teeth to contact one another under pressure in a circumferential direction thereby forming an excellent solid driving connection. The wedging interengagement between the tips of the teeth and the corresponding bases of the gaps between the opposed teeth develops a compressive radial force which solidly joins the rim to the hoop and prevents any radial play whatsoever.

Thus simply by tightening the fastening means the wear rim and hoop are joined to one another as solidly as if they were in one piece. As in the case of the sprocket 20 these wedging interengagements have the further advantage of permitting tightening of the fastening means over a period of time to take up any play which may develop because of wear and tightening of the fastening means to enable a fresh wear rim to be solidly engaged with a core which has been extensively used and abused.

Because the angles of the flat wedging surfaces are very slight and because said surfaces have been forced into very tight engagement with one another and tend to become frozen together provision preferably is made in a sprocket embodying my invention to expedite breaking of the connection between the wear rim and hoop. In the first form of my invention such connection was broken, it will be recalled, by slightly backing off the tightening bolts and rapping them in order to loosen the locking key and by then striking the sprocket teeth in order to loosen the driving lugs. The sprocket 78 of FIGS. 7–9 is not conducive to these steps for loosening the wear rim and I therefore provide, instead, a series of tapped bores 108 in the hoop 88. Said bores may be located within the hoop teeth 98 and they are oriented in a direction parallel to the axis of rotation of the sprocket. The bores 108 are at a radius such that they are in line with the flange 94 in the spaces between the rim teeth. When it is desired to loosen a worn wear rim 82 bolts (not shown) are threaded into the bores 108 until their tips press against the flange 94. By tightening such bolts in succession around the hoop eventually enough force will be exerted to jack off the old wear rim.

In FIGS. 10–11 I have shown a drive sprocket 110 which is quite similar to the drive sprocket 78. Like said drive sprocket 78 it has a core 112 and a wear rim 114 the latter being provided with sprocket teeth 116. The core has an apertured hub (not shown). The inner periphery of the wear rim is formed with rim teeth 118 separated by spaces (gaps) 120 and the outer periphery of the hoop 121 is formed with hoop teeth 122 likewise separated by spaces. The rim teeth and hoop teeth are shaped in the same fashion as the rim teeth and hoop teeth of the drive sprocket 78. That is to say the flanks of the rim teeth converge in one direction and the flanks of the drive teeth converge in the opposite direction and at the same slight angle, e.g. 5° (exaggeratedly illustrated in the drawings). Likewise the radial heights of the rim teeth and of the sprocket teeth taper in opposite directions and match the tapers of the bases of the gaps between the opposed teeth.

The wear rim 114 is mounted on the hoop 121 by lining up the rim teeth with the gaps between the hoop teeth and then sliding the wear rim onto the hoop.

The drive sprocket 110 differs from the drive sprocket 78 in that it omits the flange 94, the groove 100 and the tightening bolts 102 which constitute the fastening means for said drive sprocket 78. Instead I use for the drive sprocket 110 a different construction for the fastening means. Said fastening means must be so constructed as to develop an axial force pushing the wear rim onto the hoop in the direction in which the flanks of the rim teeth 118 converge.

The aforesaid fastening means is best illustrated in FIGS. 10 and 12. It consists of a set (e.g. six) of radially outwardly tapering closed bottomed inwardly facing sockets 124 in the rim 114 and a corresponding matched set of similarly radially outwardly tapering sockets 126 in the hoop.

Each associated pair of sockets 124, 126 are in approximate registration and if they were in exact registration would form a continuously radially outwardly tapering inwardly facing single socket. That is to say the radially inward larger diameter of the socket 124 is equal to the radially outward smaller diameter of the socket 126. The angles of the taper of the walls of the sockets 124, 126 is slight and are equal to one another, e.g. about 3°–5°. The sockets are so disposed that they are located at identical angular positions around the wear rim. However they are slightly offset in a side-to-side (axial) direction as is best shown in FIG. 10 so that when the wear rim 114 is hand tightened onto the hoop 121 the sockets 124, 126 are displaced slightly in an axial direction. This displacement is only a few thousandths of an inch and is shown exaggeratedly in FIG. 10. Said displacement is opposite to the direction in which the rim is to be tightened onto the hoop. The radially outward closed bottom of each socket 124 is formed with a tapped well 128 adapted to receive the threaded tip of a tightening bolt 130.

Associated with each pair of sockets 124, 126 is a tightening plug 132 (see FIG. 12) having a tapped axial bore 134. Said bore is large enough to pass the shank of the tightening bolt 130 without threadedly engaging the screw thereof. The plug 132 is of an axially tapered configuration and is shaped to match the combined shape of the sockets 124, 126 when the same are in alignment.

When the wear rim is hand tightened onto the hoop the two sockets are slightly out of axial alignment, i.e. alignment parallel to the direction of rotation of the sprocket as shown in FIG. 10. They also may be slightly out of alignment in an angular direction around the axis of rotation of the sprocket. However their angular alignment will be as good as can be accomplished with the naked eye. At this time the plugs 132 are placed in the various sets of substantially aligned sockets and the bolts 130 passed through the bores 134 and threaded into the tapped wells 128. Due to the slight misalignment and in particular to the slight axial misalignment of the various pairs of sockets the narrow end of the tightening plug will not be able to enter fully into the socket 124 but will be spaced a short distance away from the radially outwardly disposed base thereof.

Now the bolts 130 are tightened with wrenches thus forcing the plugs 132 more deeply into the sockets 124. As this occurs the side of each plug in the direction that the wear rim is to be forced onto the hoop engages the corresponding side of the socket 124 and the diametrically opposite side of the plug, but displaced in a radially inward direction, will engage the corresponding side of the socket 126 so that the plug forces apart these two sides of the socket thus providing the axial tightening force that is desired. As in the case of the drive sprocket 78 this axial tightening force develops a solid connection between the flat driving faces of the rim teeth and hoop teeth and also a solid connection between the tips of both sets of teeth and the bases of the gaps between the opposed teeth.

It should be mentioned that lock washers 136 or the like are placed under the heads of the tightening bolts 130 as in the case of the tightening bolts 66 and 102 to prevent the same from shaking loose.

To remove the wear rim 14, the tightening bolts 130 are screwed out, larger bolts are screwed into the tapped axial bores 134 until their tips press against the bases of the sockets 124 around the wells 128 and thereby the plugs 132 are jacked out of the sockets. Now the wear rim can be tapped smartly until it is loosened from the hoop.

Although the plug 132 is shown to have a circular transverse cross-section (see FIG. 11) it will be appreciated that this is not critical and that any desired configuration may be employed, e.g. oval or rectangular.

It thus will be seen that I have provided tractor type sprockets which achieves the several objects of my invention, and which are well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described my invention, I claim as new and desire to secure by Letters Patent:

1. A sprocket for a crawler type vehicle, said sprocket including an outermost sprocket wear rim of a wear resistant metal, said sprocket rim having a large central opening and the radial thickness of the rim being slight in comparison to the diameter of the rim, said sprocket also including a core having a peripheral hoop on which the wear rim is circumferentially seated, each of said wear rim and hoop having cooperable detachable interengageable halves of driving means carried by the inner periphery of the wear rim and the outer periphery of the hoop respectively, said halves having radially disposed flat juxtaposed areas in abutting contact in oppositely rotating directions to form a two-way driving connection between said rim and hoop, and fastening means wholly disposed within the wear rim and the core and independent of said driving means detachably securing the wear rim to the core.

2. A sprocket as set forth in claim 1 wherein the flat areas of driving connection between the hoop and rim extend parallel to the axis of rotation of the sprocket so as to minimize the unit compressive drive forces at such areas.

3. A sprocket as set forth in claim 1 wherein the flat radail areas of driving contact are at a slight angle to the axis of rotation of the sprocket and wherein the fastening means provides an axial force parallel to the axis of rotation of the sprocket which force is applied to the driving means so that when the fastening means is tightened the areas of driving contact form a wedging engagement which develops a circumferential force at the driving means which presses said areas of driving contact against one another and thereby form a solid driving joint between said halves of the driving means.

4. A sprocket as set forth in claim 1 wherein the halves of the driving means provide flat areas of contact at a slight angle to the normal to the radius at which the driving means is located and which areas are slightly inclined to the circumference of the sprocket and wherein the fastening means provides an axial force parallel to the axis of rotation of the sprocket which force is applied to the driving means so that when the fastening means is tightened the areas of contact form a wedging engagement which develops a radial force at the driving means which compresses said areas of contact against one another and thereby form a solid radial joint between said halves of the driving means.

5. A sprocket as set forth in claim 1 wherein the halves of the driving means constitutes one set of elements integral with the inner periphery of the wear rim and another set of elements integral with the outer periphery of the hoop, said sets of elements being mutually couplable.

6. A sprocket as set forth in claim 5 wherein one set of elements includes peripherally located protuberances and the other set of elements includes peripherally located openings mating with the protuberances, said protuberances and openings extending in a direction parallel to the axis of rotation and in a radial direction.

7. A sprocket as set forth in claim 6 in which the protuberances and openings provide the abutting areas and wherein said areas are located in planes that are slightly canted to the axis and circumference of the sprocket to achieve wedging interengagement and wherein the fastening means provides a force parallel to the axis of rotation of the sprocket which force is applied to the driving means so that the wedging interengagements transduce the axial force of the fastening means into a circumferentially compressive force and a radially compressive force at the butting faces of said protuberances and openings.

8. A sprocket as set forth in claim 5 wherein one set of elements includes radially extending peripheral lugs and the other set of elements includes bayonet openings each having an axial reach through which a lug is enterable and a circumferential reach in which said lug is seated, the side of the lug facing the axial reach being canted towards said reach, the fastening means including a locking key seated in the axial reach and means to force the key into the axial reach, said key engaging the canted side of the lug to force the lug into the circumferential reach, the bottom of the circumferential reach and the tip of the lug being sloped toward the axial reach so that as the lug is forced into the circumferential reach the wear rim is radially compressed against the hoop.

9. A sprocket as set forth in claim 5 wherein one set of elements includes radially extending peripheral lugs and the other set of elements includes bayonet openings each having an axial reach through which a lug is enterable and a circumferential reach in which said lug is seated, the fastening means including a locking key seated in the axial reach to retain the lug in the circumferential reach and means to force the key into the axial reach.

10. A sprocket for a crawler type vehicle, said sprocket including a sprocket wear rim of a wear resistant metal, said sprocket rim having a large central opening and the radial thickness of the rim being slight in comparison to the diameter of the rim, said sprocket also including a core having a peripheral hoop on which the wear rim is circumferentially seated, each of said wear rim and hoop having cooperable detachable interengageable halves of driving means carried by the inner periphery of the wear rim and the outer periphery of the hoop respectively which by mutual interengagement form a driving connection between said rim and hoop, and fastening means independent of said driving means detachably securing the wear rim to the core, the halves of the driving means constituting one set of elements integral with the inner periphery of the wear rim and another set of elements integral with the outer periphery of the hoop, said sets of elements being mutually couplable, one set of elements including radially extending peripheral teeth and the other set of elements including radially extending peripheral teeth, the flanks of the teeth converging in opposite directions and the spaces between each set of teeth circumferentially matching the shape of the opposed set of teeth, the fastening means providing a force parallel to the axis of rotation of the sprocket so that the wedging interengagements between the flanks of the teeth transduce the axial force of the fastening means into a circumferentially compressive force which provides a solid driving contact between the elements of the driving means.

11. A sprocket as set forth in claim 10 wherein the tips of both sets of teeth taper in opposite directions and wherein the spaces between the opposed teeth are matchingly tapered so that the axial force engendered by the fastening means also is transduced into a radial force which forms a solid radial joint between the wear rim and the hoop.

12. A sprocket as set forth in claim 10 wherein the fastening means includes a set of axially extending bolts coupling the hoop to the wear rim.

13. A sprocket as set forth in claim 10 wherein the fastening means comprises radially outwardly tapered and radially inwardly facing seats in the wear rim and hoop, said seats being equiangularly spaced around the wear rim and hoop and being almost in alignment in an axial direction when the wear rim is coupled to the hoop by hand, said fastening means including tapered plugs received in said seats and means to force the plugs into the seats so as to bring the seats closer into alignment and at the same time urge the wear rim further axially on to the hoop.

14. A rotary driven circular member for engaging an endless track of a crawler type vehicle, said member comprising a replaceable unbroken continuous outer wear rim having a toothed circular outer contour and a circular inner contour, said rim having a radial thickness that is small in comparison to its diameter and being provided with a plurality of openings in certain predetermined angular positions, a continuous circular core having a plurality of openings in the same certain angular predetermined relationship as the openings in the rim, said core further having a through central opening, the external circumferential surface of said core being matched to the internal surface of the rim so that the rim nestably fits the core, and a plurality of locking elements fully received in said openings and each element extending from an opening in the rim to an opening in the core and pressing the wear rim to the core to retain the rim on the core.

15. A sprocket for a crawler type vehicle, said sprocket including an outermost sprocket wear rim of a wear resistant metal, said sprocket rim having a large central opening and the radial thickness of the rim being slight in comparison to the diameter of the rim, said sprocket also including a peripheral hoop on which the wear rim is circumferentially seated, each of said wear rim and hoop having cooperable detachable interengageable halves of driving means carried by the inner periphery of the wear rim and the outer periphery of the hoop respectively, said halves having radially disposed flat juxtaposed areas in abutting contact in oppositely rotating directions to form a two-way driving connection between said rim and hoop, and fastening means wholly disposed within the wear rim and the hoop and independent of said driving means detachably securing the wear rim to the hoop.

References Cited by the Examiner

UNITED STATES PATENTS

| | | | |
|---|---|---|---|
| 326,121 | 9/85 | Jackson. | |
| 1,285,103 | 11/18 | Fox | 301—18 |
| 1,478,437 | 12/23 | Kaplan et al. | 301—17 |
| 1,546,206 | 7/25 | Conner | 301—17 |
| 2,467,819 | 4/49 | Firth | 287—52.04 X |
| 3,069,922 | 12/62 | Harvey | 74—243 |

DON A. WAITE, *Primary Examiner.*